US008942177B1

(12) United States Patent
Dreiling et al.

(10) Patent No.: US 8,942,177 B1
(45) Date of Patent: *Jan. 27, 2015

(54) PRESENTING AN INDICATION OF AN ORIGINATING CARRIER OF A WIRELESS CALL

(71) Applicant: Sprint Communications Company L.P., Overland Park, KS (US)

(72) Inventors: Ryan Patrick Dreiling, Overland Park, KS (US); Cesar Perez, Sunnyvale, CA (US); Woo Jae Lee, Seoul (KR)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/768,797

(22) Filed: Feb. 15, 2013

Related U.S. Application Data

(63) Continuation of application No. 12/417,851, filed on Apr. 3, 2009, now Pat. No. 8,380,178.

(51) Int. Cl.
*H04W 4/00* (2009.01)
*H04W 4/16* (2009.01)

(52) U.S. Cl.
CPC ...................................... *H04W 4/16* (2013.01)
USPC ........... 370/328; 370/310; 370/342; 370/344; 370/347; 455/567; 455/566; 455/412.2; 455/406; 455/456.1; 455/445; 455/422.1

(58) Field of Classification Search
None
See application file for complete search history.

(56) References Cited

U.S. PATENT DOCUMENTS

| 6,081,731 | A  | * | 6/2000 | Boltz et al. ..................... 455/565 |
| 6,085,101 | A  | * | 7/2000 | Jain et al. ....................... 455/500 |
| 6,208,872 | B1 | * | 3/2001 | Schmidt ......................... 455/518 |
| 6,687,357 | B1 | * | 2/2004 | Sakaue et al. ............. 379/202.01 |
| 7,200,211 | B1 | * | 4/2007 | Lemke ...................... 379/142.06 |
| 8,380,178 | B1 | * | 2/2013 | Dreiling et al. ............... 455/415 |
| 2008/0182552 | A1 | * | 7/2008 | Dinh et al. .................... 455/408 |
| 2011/0021177 | A1 | * | 1/2011 | Honda et al. .................. 455/411 |

* cited by examiner

*Primary Examiner* — Willie J Daniel, Jr.

(57) ABSTRACT

A method, system, and medium are provided for presenting carrier-specific information associated with an incoming communication on a mobile network. The method, system, and medium include a device that receives call information associated with an incoming call. The call information includes carrier-identification information that is useable to identify an originating carrier responsible for originating the incoming call. The carrier-identification information is communicated to a database and the database retrieves carrier-specific data. The carrier-specific data is communicated to a mobile device and presented via a presentation component coupled to the mobile device. The carrier-specific data may include a carrier identifier ("carrier-ID"), geographic designation, and a denotation as to whether the incoming communication is an in-carrier communication versus an inter-carrier communication. The presentation component may include a display, a speaker, and a vibration apparatus.

16 Claims, 6 Drawing Sheets

PRESENTING AN INDICATION OF AN ORIGINATING CARRIER OF A WIRELESS CALL

CROSS-REFERENCE TO RELATED APPLICATIONS

This application is a continuation of U.S. patent application Ser. No. 12/417,851, filed Apr. 3, 2009, entitled "Presenting An Indication Of An Originating Carrier Of A Wireless Call," which is incorporated by reference.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter.

There are a number of carriers that provide mobile services to a network of customers. These mobile carriers may differentiate between an inter-carrier communication and an in-carrier or intra-carrier communication and bill their customers accordingly. For example, some carriers may not deduct in-carrier communications from the customer's monthly plan minutes. A call may be considered in-carrier communication if the originating party is "in network" with the receiving party. For instance, if the originating party is a customer of carrier A and the receiving party is also a customer of carrier A, then carrier A may consider any communication between the two customers as an in-carrier communication and provide "free" minutes for any communications between these two customers. Likewise, carrier A may establish an agreement with carrier B that any communications between customers of the two carriers will be considered an in-carrier communication. In contrast, carrier A and carrier C may be competitors and treat any communications between their respective customers as inter-carrier communications. Thus, carrier A and carrier C would deduct used minutes from their customer's plan for any inter-carrier communications. Given this classification for incoming communications, a mobile customer would find it desirable to know how their particular carrier classifies incoming communications. This information could be used with other caller identification features ("Caller ID") to help the receiving party decide on whether to receive or stay the communication.

Caller ID is one service provided by carriers to their mobile customers. Caller ID identifies the caller's name and phone number associated with the incoming call and displays the name and phone number to the receiving party on the mobile device. The receiving party can then determine if they want to receive or stay the call while the incoming communication is still pending. While beneficial in this respect, present caller ID systems fail to identify an incoming communication as an in-carrier or inter-carrier communication. Instead, they are limited to the name and phone number of the originating party. In other words, present Caller ID systems provide no indication on how the incoming communication might be billed or charged against plan minutes. Thus, embodiments of the present invention provide systems, methods, and media for passing the carrier-specific information to the customer along with the Caller ID information.

In a first aspect, a method is furnished for providing carrier-identification capability to a mobile device. The method includes, in one embodiment, receiving call information that is associated with an incoming call. This call information includes carrier-identification information that is useable to identify an originating carrier responsible for originating the incoming call. The method includes communicating the carrier-identification information to a database that stores carrier-specific data that is specific to the originating carrier. The database is queried to retrieve the carrier-specific data based on the communicated carrier-identification information. The carrier-specific data is received, and is communicated to a mobile device. The carrier-specific data includes a denotation as to whether the incoming communication is from a person designated within a user-defined group and whether the incoming communication is an in-carrier communication or an inter-carrier communication. When the incoming communication is from the person designated within the user-defined group, then a denotation of in-carrier communication is assigned to the incoming communication when the incoming communication would otherwise be considered an inter-carrier communication. The mobile device is thereby enabled to present the carrier-specific data by way of a presentation component coupled to the mobile device.

In a second aspect, a system is provided for enabling a wireless mobile-communications device to present originating-carrier-specific information. The system includes a switch configured to receive an incoming call and call information that is associated with the incoming call. The call information includes carrier-identification information that is useable to identify an originating carrier that is responsible for originating the incoming call. The call information also includes a denotation as to whether the incoming call is an in-carrier communication or an inter-carrier communication, and information regarding whether the incoming call is from a person designated within a user-defined group. The switch is further configured to, when the incoming call is from a person designated within the user-defined group, assign an identification of in-carrier communication to the incoming call even when the incoming call would otherwise be considered an inter-carrier communication. The system further includes a database in communication with the switch. The database stores carrier-specific data that is specific to the originating carrier, and useable to return a query from the switch that seeks carrier-specific data based on the carrier-identification information. In addition, the system includes a mobile device that is operable to receive the carrier-specific data when communicated from the switch and that is further operable to present the carrier-specific data via a presentation component coupled to the mobile device.

In a third aspect, a method for presenting carrier-specific information associated with an incoming communication is provided. The method includes receiving, at the mobile device, carrier-specific information that is associated with the incoming communication. The carrier-specific information identifies an originating carrier that is responsible for originating the incoming communication. The carrier-specific information also identifies whether the incoming communication is from a person designated within a user-defined group. This carrier-specific information is obtained by way of a switch that is in communication with the originating mobile device. The switch extracts the carrier-specific information from a database. The method also includes presenting an identification of whether the incoming communication is an in-carrier communication or an inter-carrier communication. When the incoming communication is from the person designated within the user-defined group, an identification of in-carrier communication is assigned to the incoming communication even when the communication would otherwise be considered an inter-carrier communication. An indication of the carrier-specific information is displayed on a display of the mobile device.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| CDMA | Code Division Multiple Access |
| FDMA | Frequency Division Multiple Access |
| GPRS | General Packet Radio Service |
| GSM | Global System for Mobile Communications |
| IEEE | Institute of Electrical and Electronic Engineers |
| I/O | Input/Output |
| OFDMA | Orthoginal Frequency Division Multiple Access |
| SS7 | Signaling System 7 |
| TDMA | Time Division Multiple Access |
| WiMAX | World-Wide Interoperability for Microwave Access |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
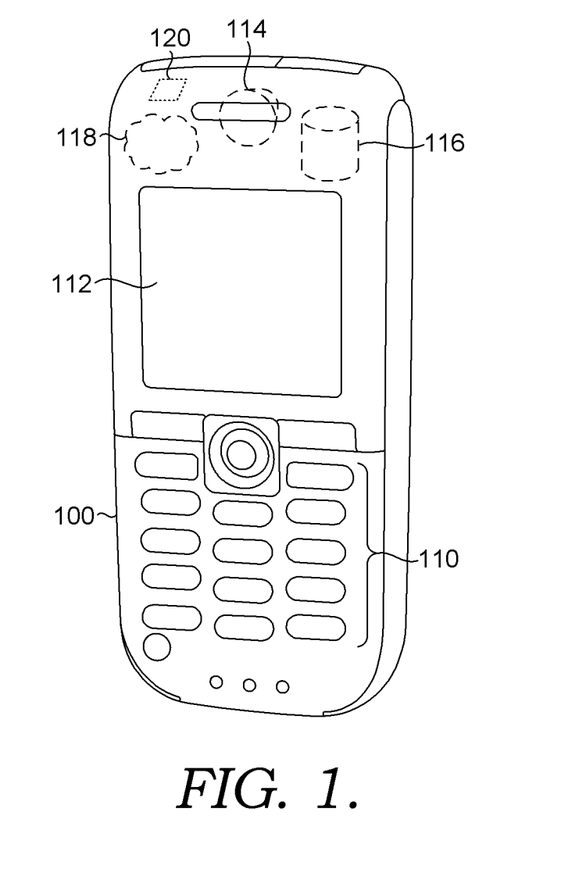
FIG. 1, depicts an illustrative mobile communications device suitable for practicing an embodiment of the present invention.

Turning now to FIG. 1, an illustrative mobile communications device is provided and referenced generally by the numeral 100. For brevity or as a shorthand form, this description might refer to a "mobile device" or even just "device" instead of a "mobile communications device." This shorthand does not mean to imply a distinction with the different terms. Mobile communications device 100 includes a keypad 110 as well as a display 112, which is suitable for presenting a user interface. As discussed in more detail below, display 112 provides an input/output (I/O) interface that can present data to a user of device 100. Acting as an I/O device, display 112 may be a touch screen or a view screen.

In addition, device 100 may also include one or more other I/O devices. For example, device 100 may include speaker 114 and vibration apparatus 116. Speaker 114 may play an audio sound to alert a user of an incoming communication to device 100. This audio sound may include various ring tones or other audio alerts. Similarly, vibration apparatus 116 may vibrate device 100 to alert a user of an incoming communication to the device. This vibration may be generated by using a motor to rotate an unbalanced mass contained within device 100. There are a number of different ways to use speaker 114 and vibration apparatus 116. Embodiments of the present invention generally use these devices to alert the user of an incoming communication. Examples of ways to alert a user with either of these types of I/O devices will be discussed in more detail with regards to FIG. 3. In addition, a microphone (not pictured) is included in device 100 as a further I/O device.

Device 100 may also include control software 118 and memory 120. Control software 118 carries out various functional aspects and might take on a variety of forms. For example, the control software might include configuration settings, might facilitate communicating data between multiple devices, might handle updates, include user settings, etc. Memory 120 may include a data structure that stores control software 118 and facilities the operation of control software 118. For example, memory 120 may include a database of stored numbers that may be referenced by control software 118 as will be discussed with regard to FIG. 6.

Figure 2:
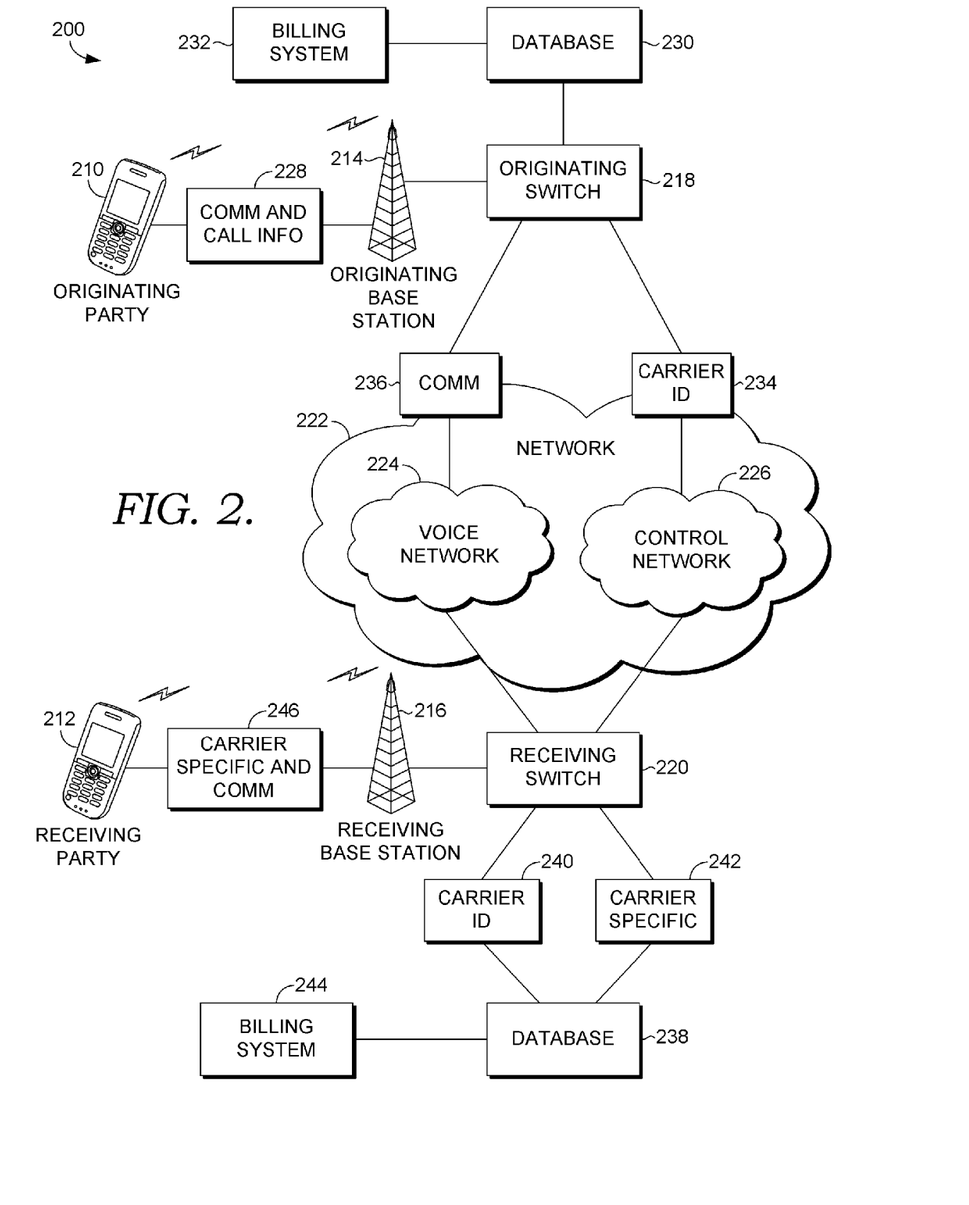
FIG. 2, depicts an illustrative operating environment suitable for practicing an embodiment of the present invention.

Turning now to FIG. 2, an illustrative operating environment suitable for practicing an embodiment of the present invention is provided and referenced generally by the numeral 200. Operating environment 200 enables a first mobile device 210 or originating party to communicate with a second mobile device 212 or receiving party. Mobile devices 210 and 212 are equipped with radios and the communication may be carried out using wireless technology. This wireless technology may include, but is not limited to, Time Division Multiple Access (TDMA), Frequency Division Multiple Access (FDMA), Orthogonal Frequency Division Multiple Access (OFDMA), Code Division Multiple Access (CDMA), GSM (Global System for Mobile Communications), GPRS (General Packet Radio Service), or WiMAX (World-Wide Interoperability for Microwave Access) technology. Of course, there may be more than two mobile devices included in operating environment 200 and the use of two devices is for exemplary purposes only.

Using one or more of these technologies, a radio located in originating mobile device 210 may communicate with an originating base station 214. Likewise, a radio located in receiving mobile device 212 may communicate with receiving base station 216. Operating environment 200 further provides that each base station 214, 216 is in communication with a respective switch. Specifically, originating base station 214 is in communication with originating switch 218 and receiving base station 216 is in communication with receiving switch 220.

The originating switch 218 and receiving switch 220 are in communication via a network 222. Network 222 may include a voice network 224 and control network 226. Control network 226 may include a Signaling System 7 (SS7) standard communication system that is used to establish a call, and transmit the call information associated with the call. This call information may also include carrier-identification information that is useable to identify an originating carrier responsible for originating the call. Referring to FIG. 2, the call information associated with an incoming call is transmitted from the originating party 210 to the receiving party 212 via control network 226 and the respective switches 218, 220. Likewise, the incoming communication 236 is transmitted from the originating party 210 to the receiving party 212 via network 224 and the respective switches 218, 220.

Thus, network 222, in coordination with the respective base stations 214, 216 and respective switches 218, 220 is used to place an originating party in communication with a receiving party. Specifically, the originating party may initiate a communication via mobile device 210. Mobile device 210 then transmits the communication and associated call information 228 to originating base station 214. Base station 214 then transmits call information 228 to originating switch 218. At this point, originating switch 218 identifies and/or adds the originating carrier information or carrier identification to the associated call information 228. In an alternate embodiment of the present invention, originating switch 218 may be in communication with a database 230 and billing system 232 that can be queried to identify the originating carrier and related billing arrangements.

Once originating switch 218 verifies that the carrier-identification information is included in the communication and call information 228, originating switch 218 transmits the information to receiving switch 220 via network 222. This transmission may occur by sending communication 236 over voice network 224 and carrier-identification 234 over control network 226. Receiving switch 220 then receives the incoming call and the call information associated with the incoming call.

Upon receiving the incoming call and the associated call information, receiving switch 220 may communicate the carrier-identification information 240 to database 238. Database 238 may be configured to store carrier-specific data that is specific to the originating carrier. For example, database 238 may determine whether the originating carrier is an in-carrier communication or inter-carrier communication with respect to the receiving mobile device 212. Thus, receiving switch 220 may communicate carrier-identification information 240 to database 238, and then query database 238 to receive carrier-specific data 242 based on the communicated carrier-identification information 240. Carrier-specific data 242 may include a carrier identifier ("carrier-ID"), a geographic designation, or a denotation as to whether the incoming communication is in-carrier communication or an inter-carrier communication. The in-carrier communication and inter-carrier distinction will be discussed in more detail below.

In addition, billing system 244 may be coupled to database 238 to provide further information as part of the carrier-specific data 242. For example, billing system 244 may include billing rates, charges, or fees associated with a mobile device 212. These billing rates, charges, or fees may be communicated with carrier-specific data 242 to receiving switch 220 as part of the carrier-specific data 242.

Upon receiving carrier-specific data 242, receiving switch 220 may communicate carrier-specific data to receiving mobile device 212 via receiving base station 216. A standard-based communication may be used between the switch/base station and the devices to transport the carrier-specific data from the switch/base station to the device. For example, Information System 2000 (IS2000) may be used as the standard-based communication. Mobile device 212 may then present carrier-specific data and incoming communication 246 to a user by way of a presentation component. In one embodiment, receiving switch 220 may include a look-up table to correlate the carrier-specific data to a carrier text string that is passed to mobile device 212. In addition, as discussed in more detail below, the presentation of carrier-specific data 246 may include more than a character string and take on a number of different forms and formats.

Figure 3:
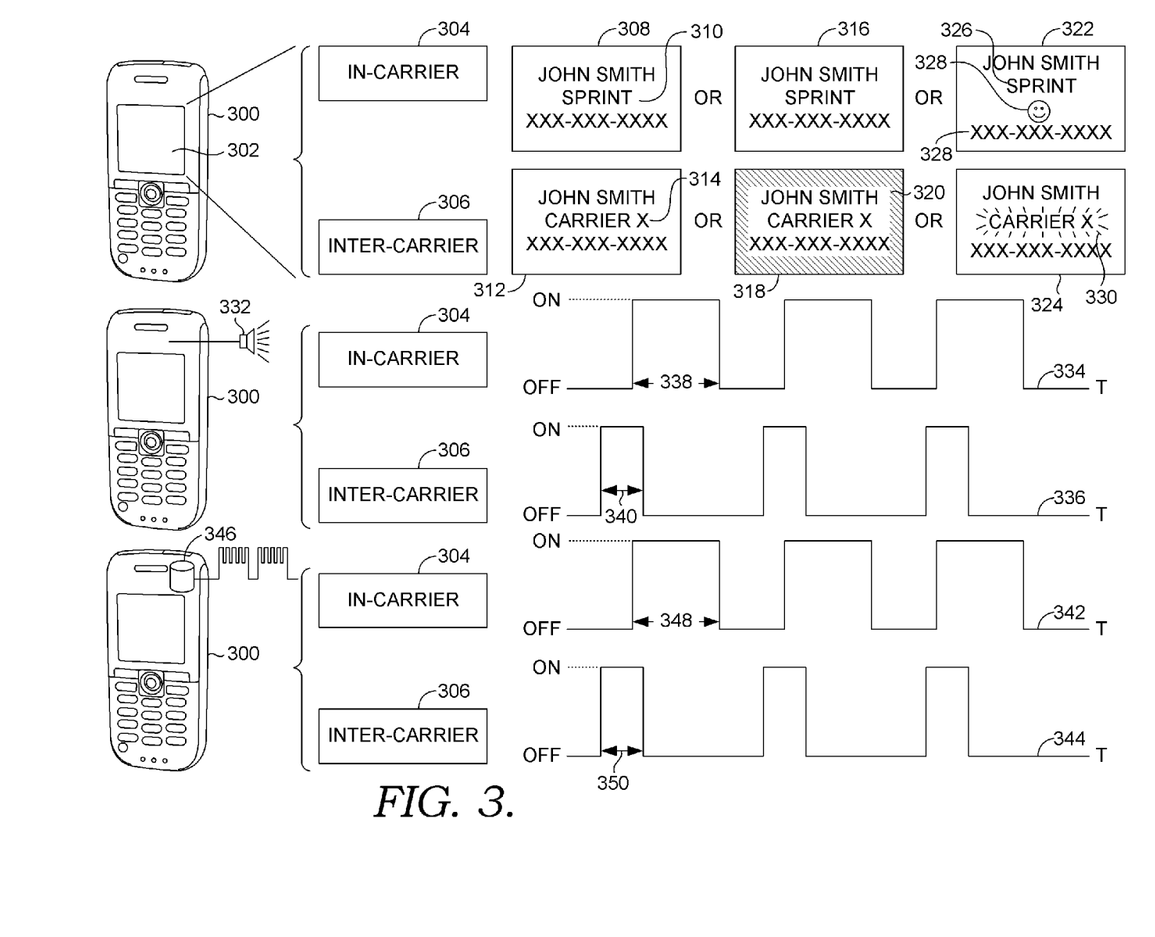
FIG. 3, depicts illustrative user interfaces suitable for practicing an embodiment of the present invention.

FIG. 3 illustrates a few examples for presenting and indicating an in-carrier communication versus an inter-carrier communication via mobile device 300. As discussed above, mobile carriers may differentiate between an inter-carrier communication and an in-carrier communication. For example, carrier A may not count minutes against a customer's plan when the communication is with another customer that uses the same carrier. Further, carrier A may not count minutes against a customer's plan if the incoming call is from a person designated within a user-defined group. Thus, a denotation of an in-carrier communication signals to a user the possibility of a different billing arrangement, or some other incentive, in comparison to an inter-carrier communication. Likewise, an indication of an inter-carrier communication signals to the user that the incoming call has a less favorable billing arrangement when compared to an in-carrier communication. It should be noted that carriers can make arrangements and decide that a communication between different carriers will be considered an in-carrier communication. Thus, the "in-carrier" designation is not necessarily limited to communications provided by only one carrier.

As discussed with regard to FIGS. 1 and 2, mobile device 300 may include a display 302 for presenting carrier-specific data 246 to a user. As illustrated in FIG. 3, display 302 may communicate carrier-specific data as an in-carrier communication 304 or inter-carrier communication 306 in a number of different ways. For example, display 302 may indicate the name of the originating carrier as shown in display 308. Specifically, display 308 indicates "Sprint"™ 310 as the originating carrier. Thus, a user of mobile device 300 could identify the originating carrier by reading a character string 310 displayed with the other caller ID information. This allows the user to simply read display 308 to identify the originating carrier. Likewise, display 312 provides a generic example of a carrier that is not considered inter-carrier. Specifically, display 312 illustrates the originating carrier as "CARRIER X" 314 which infers the incoming communication would be considered in-carrier.

In addition, any variation of characters may used to distinguish between in-carrier communications and inter-carrier communications. For example, abbreviations of the carrier's name may be used. For instance, SP for Sprint™, VZ for Verizon™, AT for AT&T™, LA for landline, etc. Alternatively, the character "O" may be used to indicate in-carrier, the character "X" may be used to indicate inter-carrier, and the character "L" for landline. As illustrated by these examples, there are a number of characters that may be used to distinguish an in-carrier communication from an inter-carrier communication.

In addition, displays 316 and 318 present alternate embodiments, used alone or in conjunction with the other examples, to indicate in-carrier communication 304 versus inter-carrier communication 306. For example, display 318 includes a shading to indicate the background color of display 302 may be changed when an inter-carrier communication 306 is received. In contrast, the figure illustrates that the background color of display 302 for an in-carrier call 304 remains unchanged 316, or may use another distinguishable color from that of display 318. Likewise, either of the backgrounds may flash or provide some other indication to distinguish an in-carrier communication 304 versus an inter-carrier communication 306. For example, if the communication is in-carrier, the background might flash green versus an inter-carrier communication where the background might flash red.

Finally, displays 322 and 324 provide two other possible examples for distinguishing between an in-carrier communication 304 and an inter-carrier communication 306. Specifically, display 322 includes both character string 326, identifying the originating carrier, and a graphic 328 to further indicate an in-carrier communication. Thus, character string 326 may not be necessary in the display because graphic 328 may provide the required indication to a user of mobile device 300. Likewise, display 324 provides another example of a way to distinguish between an in-carrier communication 304 and an inter-carrier communication 306. Specifically, character string 330 is indicated as flashing or blinking to grab the attention of a user. In sum, displays 308, 312, 316, 318, 322, 324 provide a few possible embodiments of the present invention and are not intended to be representative of all possible embodiments. In general, all of these examples illustrate ways of using characteristics of display 302 to indicate whether an incoming communication is an in-carrier communication 304 or an inter-carrier communication 306.

FIG. 3 also provides examples of how speaker 332 may be used to distinguish between an in-carrier communication 304 and an inter-carrier communication 306. Specifically, the figure illustrates two timelines 334 and 336. In these timelines, the x-axis represents time and the y-axis represents turning a speaker on or off. These timelines generally illustrate a length of time that an audio sound generated by speaker 332 may be played. For example, timeline 334 indicates that when an incoming communication is received, speaker 332 may play a sound three times. As indicated by comparing timelines 334 and 336, this sound would play for a longer period of time for in-carrier communications 304 than it would for an inter-carrier communication 306, as illustrated by comparing period of time 338 to 340. Thus, a user of mobile device 300 would be able to identify an in-carrier communication 304 simply by observing the period of time the sound is played by speaker 332.

Time duration is not the only way speaker 332 may indicate the originating carrier. For example, speaker 332 may play a first ring tone or chime for an in-carrier communication 304 and a second ring tone or chime for an inter-carrier communication 306. These ring tones may be in addition to any custom ring tones specified by the user. There are also a number of additional ways to use speaker 332 to distinguish an in-carrier communication 304 from an inter-carrier communication 306. For example, the pitch, tone, or volume of a sound or ringtone may be used as other possible variations. In sum, anything that is played by the speaker, and any variable related to the speaker's performance, may be used to indicate the originating carrier.

FIG. 3 also provides examples of how vibration apparatus 346 may be used to distinguish between an in-carrier communication 304 and an inter-carrier communication 306. Specifically, the figure illustrates two timelines 342 and 344. In these timelines, the x-axis represents time and the y-axis represents turning the vibration apparatus on or off. These timelines generally illustrate a length of time that mobile device 300 would be vibrated by vibration apparatus 346. For example, timeline 342 indicates that when an incoming communication is received, vibration apparatus 346 may vibrate mobile device 300 three times. As indicated by comparing timelines 342 and 344, this vibration would have a longer period of time for in-carrier communications 304 than it would for an inter-carrier communication 306, as illustrated by comparing period of time 348 to 350. Thus, a user of mobile device 300 would be able to identify an in-carrier communication 304 simply by observing the period of time the mobile device is vibrated by vibration apparatus 346.

In sum, timelines 334, 336, 342, 344 illustrate a few possible examples of using speaker 332 and/or vibration apparatus 346 to indicate the originating carrier of an incoming call. Specifically, the period of time the presentation component was engaged was used as one possible variable to distinguish between an in-carrier communication and inter-carrier communication. Although specific examples are illustrated in FIG. 3, these examples do not include all of the possible embodiments. For example, the period of time used to indicate could be swapped with the inter-carrier communication having a longer period of time than the in-carrier communication. Again, these timelines are only representative of possible time durations and magnitudes for employing speaker 332 and vibration apparatus 346.

Figure 4:
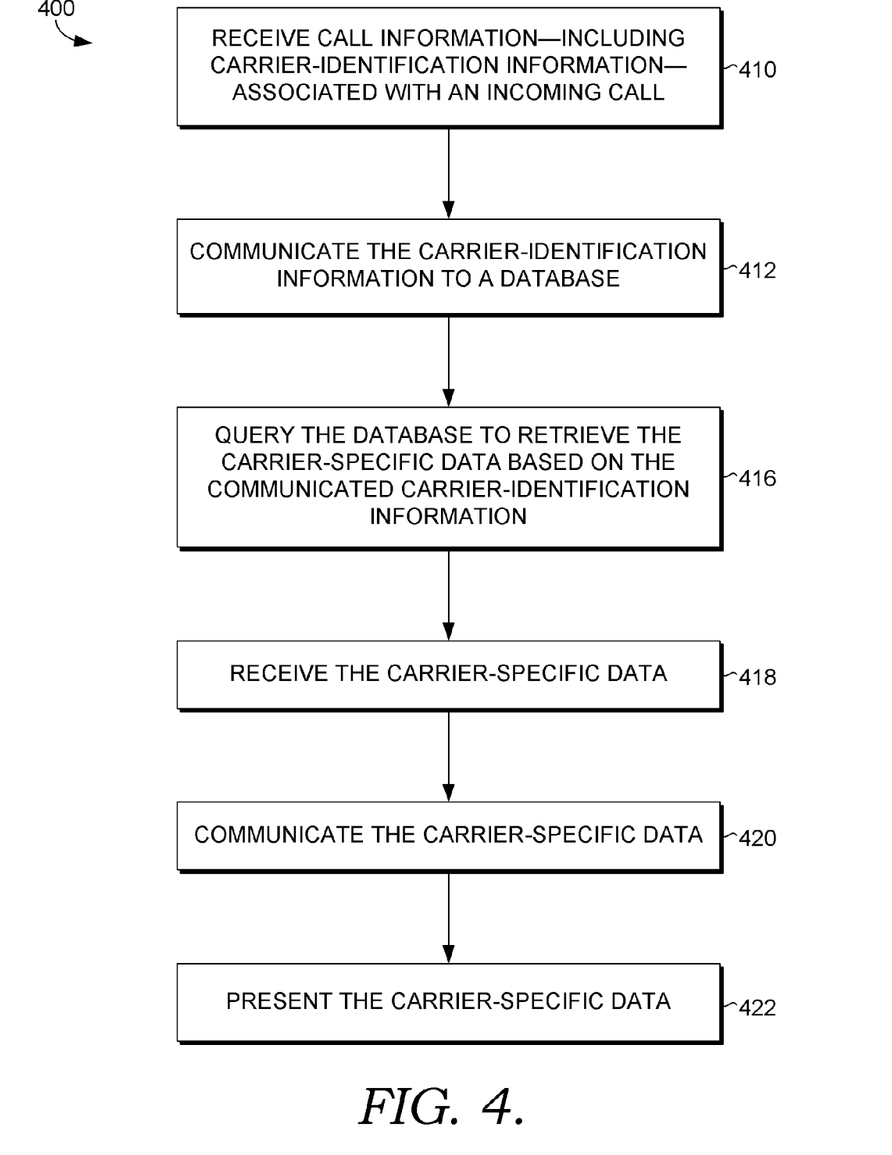
FIGS. 4-6, depict illustrative methods for enabling a wireless mobile-communications device to present carrier-specific information.

Turning now to FIG. 4, an illustrative method for practicing an embodiment for the present invention is provided generally by the numeral 400. At a step 410, call information that is associated with an incoming call is received by a switch. This call information includes carrier-identification information. For example, referring to FIG. 2, receiving switch 220 receives carrier-identification information 234 that can be used to identify an originating carrier responsible for originating the incoming call 228. Again, receiving switch 220 is in communication with originating switch 218 via network 222. Network 222 delivers both carrier ID 234 and incoming communication 236 from originating party 210 to receiving switch 220.

At a step 412, receiving switch 220 communicates carrier-identification information 240 to a database 238. As discussed, database 238 may store specific data that is specific to the originating carrier. At a step 416, receiving switch 220 may query database 238 to retrieve carrier-specific data 242. The carrier-specific data may be based on the communicated carrier ID 240 that is communicated to database 238 from receiving switch 220.

At a step 418, receiving switch 220 receives the carrier-specific data 242. In addition, database 238 may be in communication with billing system 244 and the billings rates, charges, or fees associated with mobile device 212 may be communicated to receiving switch 220 along with or as part of carrier-specific data 242. At a step 420, receiving switch 220 communicates the carrier-specific data to receiving base station 216, and further to receiving mobile device 212.

Again, receiving switch 220 may also communicate billing rates, charges, or fees to receiving party 212 along with carrier-specific data 242.

At a step 422, mobile device 212 may communicate carrier-specific data 246 to a user. This communication may take place via a presentation component coupled to mobile device 212. With reference to FIG. 3, this presentation component may include display 302, speaker 332, or vibration apparatus 346. With further reference to FIG. 3, the presentation of carrier-specific data 242 and/or billing-related data may be presented to the user in a number of different formats.

Figure 5:
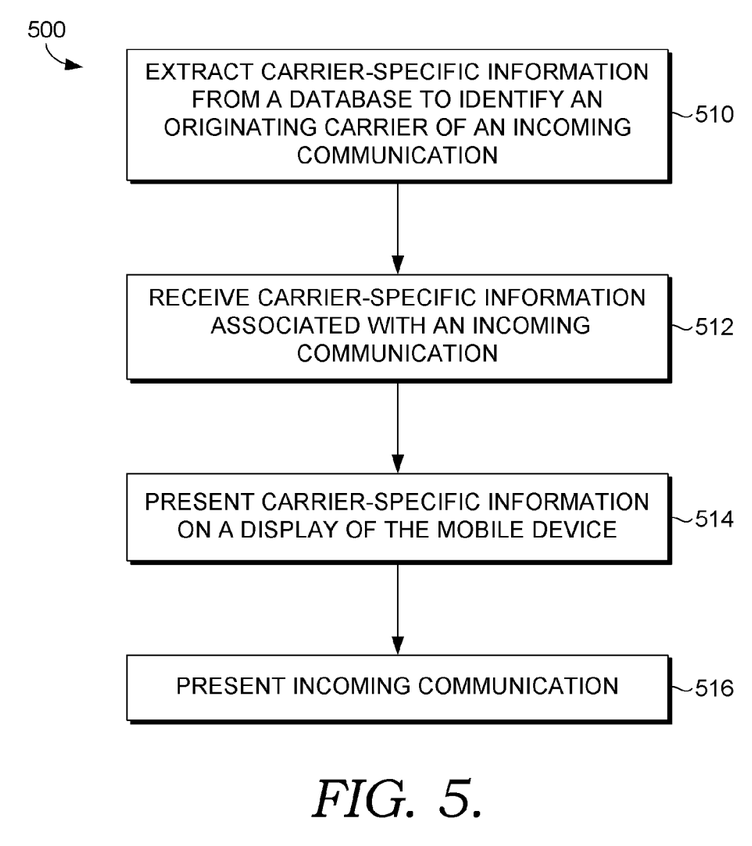

Turning now to FIG. 5, another illustrative method for practicing an embodiment of the present invention is provided generally by the numeral 500. At a step 510, carrier-specific data is extracted from a database. With reference to FIG. 2, carrier-specific data 242 may be extracted via receiving switch 220 from database 238. The carrier-specific data 242 identifies the originating carrier of incoming communication 220. At a step 512, mobile device 212 receives carrier-specific information 242 that is associated with the incoming communication 220. At a step 514, mobile device 212 may present carrier-specific information 246 on a display of the mobile device. Referring to FIG. 3, displays 308, 312, 316, 318, 322, 324 illustrate a few examples of indicating the originating carrier for an incoming communication to a user of mobile device 300. Specifically, these examples provide ways of distinguishing between in-carrier communication 304 and inter-carrier communication 306. For example, embodiments of the present invention provide ways to change or alter the characteristics of the display. For instance, the background color of display 300 may be changed, the format of a character(s) displayed on display 300 may be changed, or a graphic may be added or removed from display 300. Specifically, displays 316 and 318 provide examples of changing a background color of the display. Displays 322 and 324 provide examples of displaying a graphic or changing the format of a character displayed on the display 302.

Finally, at a step 516, mobile device 300 may present incoming communication 228 to a user. The incoming communication may include a call, a text, and/or a video message or a combination of these. Upon receiving the originating carrier identification, the user may determine to accept the incoming communication 228 or stay the communication.

Figure 6:
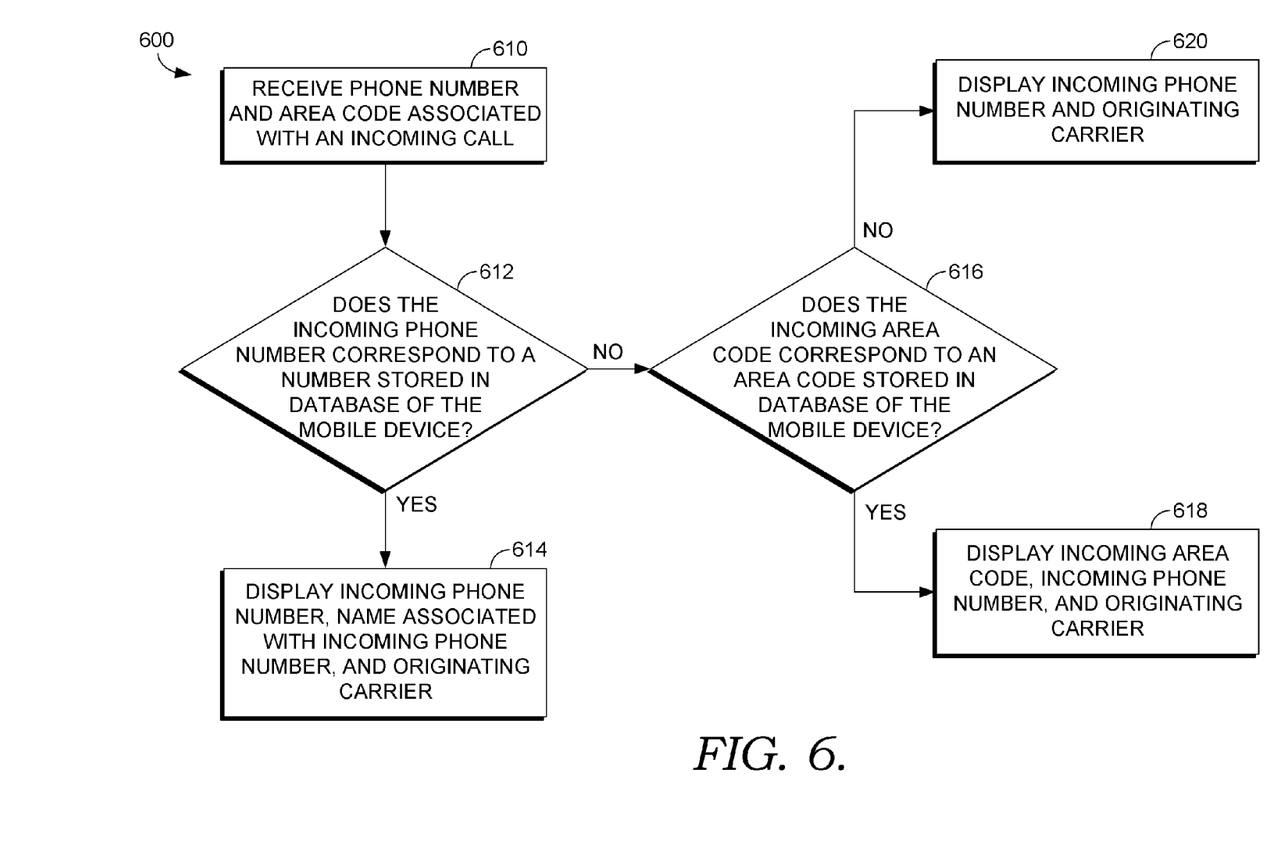

Turning now to FIG. 6, another illustrative method for practicing an embodiment of the present invention is provided generally by the numeral 600. At a step 610, mobile device 212 receives a phone number and an area code associated with an incoming call from receiving switch 220. The phone number and area code are presented with the carrier-specific information 246 associated with incoming call 228.

At a step 612, a determination is made as to whether the incoming phone number corresponds to a number stored in a database of the mobile device. Referring to FIG. 1, memory 120 may include a database that can be referenced to make this determination. This database may include numbers or contacts that are automatically stored by mobile device 100 and/or by a user of mobile device 100. These contacts may be referenced to identify both the originating caller and the originating carrier associated with the incoming call. In addition, the database can be external to mobile device 100 and accessed by the mobile device as needed. Database 230 in FIG. 2 provides one example of an external database that could store the contact information.

At a step 612, if the phone number and area code is found in the database, the mobile device presents the incoming phone number, the name associated with the incoming phone number, and the originating carrier at a step 614. If the incoming phone number is not found in the database, then the control software 118 would proceed to a step 616.

At a step 616, a determination is made as to whether the incoming area code corresponds to an area code stored in the database. Again, this database may be stored in memory 120 of mobile device 100 and/or external to mobile device 100. If the incoming area code is found in the database, then at a step 618 mobile device 100 may display the incoming area code, incoming phone number, and originating carrier. If the incoming area code does not correspond to an area code stored in the database, then the control software 118 would proceed to a step 620.

At a step 620, mobile device 100 may display an incoming phone number and the originating carrier. As previously discussed, mobile device 100 receives the originating carrier information as part of the carrier-specific data 242. Thus, the mobile device may display the originating carrier regardless if the phone number or area code is found in the database.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media usable for storing information, having computer-useable instructions embodied thereon that, when executed, enable a computing device to perform a method of providing carrier-identification capability to a mobile device, the method comprising:

receiving call information that is associated with an incoming call, wherein the call information includes carrier-identification information that is useable to identify an originating carrier responsible for originating the incoming call;

communicating the carrier-identification information to a network database associated with a particular network carrier through a receiving switch, the network database storing carrier-specific data that is specific to the originating carrier;

querying the network database to retrieve the carrier-specific data based on the communicated carrier-identification information;

receiving the carrier-specific data from the network database through the receiving switch, wherein the receiving switch originally received the carrier-identification information from an originating switch via a control network and received communication via a voice network;

querying the network database to receive the carrier-specific data based on the communicated carrier-identification information, wherein the carrier-specific data includes a carrier identifier ("carrier-ID"), a geographic designation, or a denotation as to whether the incoming communication is in-carrier communication or an inter-carrier communication;

prior to communicating the carrier-specific data from the particular network carrier to the mobile device, determining by the particular network carrier that the incoming communication is from a person designated within a user-defined group and whether the incoming communication is an in-carrier communication or an inter-carrier communication, wherein when the incoming communication is from the person designated within the user-defined group, then assigning a denotation of in-carrier communication to the incoming communication when the incoming communication would otherwise be considered an inter-carrier communication; and communicating the carrier-specific data from the particular network carrier to the mobile device, wherein the carrier-specific data includes the denotation as to whether the incoming communication is from the person designated within the user-defined group and whether the incoming communication is an in-carrier communication or an inter-carrier communication, thereby enabling the mobile device to present the carrier-specific data by way of a presentation component coupled to the mobile device.

2. The media of claim 1, wherein the denotation as to whether the incoming communication is an in-carrier communication or an inter-carrier communication is presented for a first period of time for an in-carrier communication and a second period of time for an inter-carrier communication.

3. The media of claim 1, wherein presenting the carrier-specific data includes displaying a character string denoting whether the incoming communication is an in-carrier communication versus an inter-carrier communication.

4. The media of claim 1, wherein presenting the carrier-specific data includes displaying a color denoting whether the incoming communication is an in-carrier communication versus an inter-carrier communication.

5. The media of claim 4, wherein displaying a color includes changing a background color of the display.

6. The media of claim 1, wherein presenting the carrier-specific data includes playing a sound to indicate whether the incoming communication is an in-carrier communication versus an inter-carrier communication.

7. The media of claim 1, wherein presenting the carrier-specific data includes vibrating the mobile device to indicate whether the incoming communication is an in-carrier communication versus an inter-carrier communication.

8. The media of claim 1, wherein the database is coupled to a billing system that includes billing rates, charges, or fees associated with the mobile device, and communicating the carrier-specific data includes communicating at least one billing rate, charge, or fee.

9. A system for enabling a wireless mobile-communications device ("mobile device") to present originating-carrier-specific information, the system comprising:

a receiving switch configured to receive an incoming call and associated carrier-identification information, wherein the receiving switch receives the carrier-identification information from an originating switch via a control network and receives communication via a voice network, wherein the carrier-identification information is useable to identify an originating carrier that is responsible for originating the incoming call, wherein the call information also includes a denotation as to whether the incoming call is an in-carrier communication or an inter-carrier communication, and information indicating that the incoming call is from a person designated within a user-defined group, wherein prior to communicating the call information to the mobile device, the receiving switch is further configured to, when the incoming call is from a person designated within the user-defined group, assign an identification of in-carrier communication to the incoming call even when the incoming call would otherwise be considered an inter-carrier communication;

a network database in communication with the receiving switch, wherein the network database stores carrier-specific data that is specific to the originating carrier, and thereby useable to return a query from the receiving switch that seeks carrier-specific data based on the carrier-identification information, wherein the carrier-specific data includes a carrier identifier ("carrier-ID"), a geographic designation, or a denotation as to whether the incoming communication is in-carrier communication or an inter-carrier communication; and the wireless mobile communicating device that is operable to receive the call information when communicated from the switch and that is further operable to present the call information via a presentation component coupled to the mobile device.

10. The system of claim 9, wherein the presentation component is configured to indicate whether the incoming communication is an in-carrier communication versus an inter-carrier communication and includes one or more of:

a display;
a speaker; or
a vibration apparatus.

11. The system of claim 9, further comprising a billing system coupled to the network database, wherein the billing system stores billing rates, charges, or fees associated with the mobile device and communicates at least one billing rate, charge, or fee as part of the carrier-specific data.

12. Non-transitory computer-readable media having computer-useable instructions embodied thereon that, when executed, enable a mobile device to perform a method of presenting carrier-specific information associated with an incoming communication, the method comprising:

at the mobile device, receiving carrier identification information that is associated with the incoming communication, wherein the carrier identification information identifies an originating carrier that is responsible for originating the incoming communication, wherein the carrier identification information also identifies that the incoming communication is from a person designated within a user-defined group, and wherein the carrier identification information is obtained by way of a receiving switch that is in communication with the originating mobile device, wherein the receiving switch originally received the carrier-identification information from an originating switch via a control network and received communication via a voice network, wherein the receiving switch extracts carrier-specific data from a network database associated with a particular network carrier, prior to communicating the carrier-specific data to the mobile device, wherein the carrier-specific data includes a carrier identifier ("carrier-ID"), a geographic designation, or a denotation as to whether the incoming communication is in-carrier communication or an inter-carrier communication;

identifying by the particular network carrier, whether the incoming communication is an in-carrier communication or an inter-carrier communication, wherein when the incoming communication is from the person designated within the user-defined group, assigning an identification of in-carrier communication to the incoming communication even when the communication would otherwise be considered an inter-carrier communication;

communicating the carrier-specific data from the particular network carrier to the mobile device; and displaying an indication of the carrier-specific data on a display of the mobile device.

13. The media of claim 12, wherein the incoming communication includes one or more of a call, a text message, or a video message.

14. The media of claim 13, wherein the indication includes one or more of a character string or a change in a display characteristic.

15. The media of claim 14, wherein the change in a display characteristic includes one or more of:

changing a background color of the display;

changing a format of a character displayed on the display; or changing a graphic displayed on the display.

16. The media of claim 12, further comprising identifying an incoming phone number associated with the incoming call, wherein the incoming phone number includes an incoming area code;

displaying the incoming phone number, a name associated with the incoming phone number, and the originating carrier-specific data if the incoming phone number is identified in a database of the mobile device; or displaying the incoming area code, the incoming phone number, and the originating carrier-specific data if the incoming area code is identified in the network database but the incoming phone number is not; or displaying the incoming phone number and the originating carrier-specific data if neither the incoming phone number nor incoming area code is identified in the network database.

\* \* \* \* \*